July 2, 1957  T. M. DAUPHINEE  2,798,198
METHOD AND APPARATUS FOR COMPARING VOLTAGES
Filed March 31, 1952  2 Sheets-Sheet 1
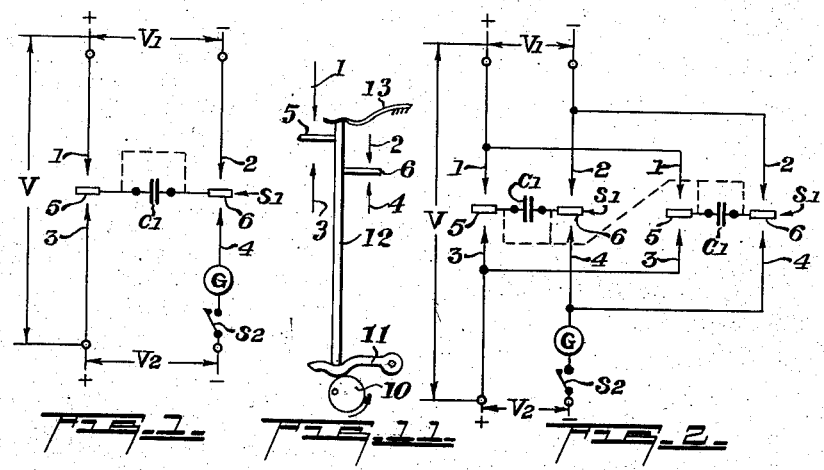
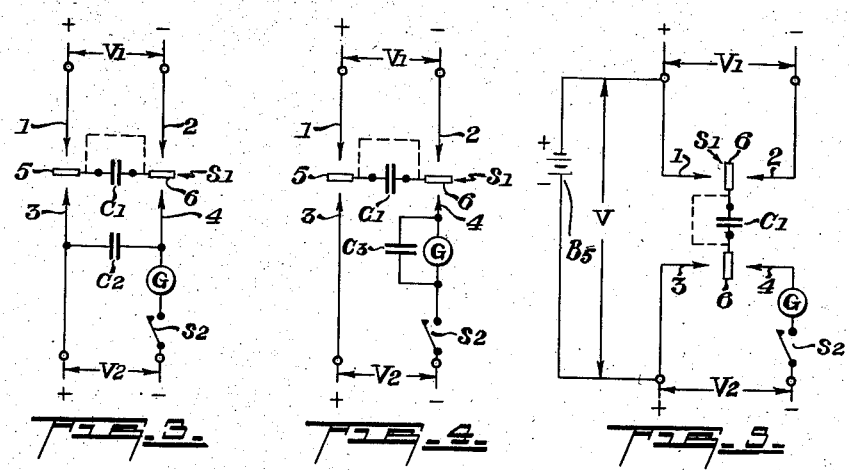
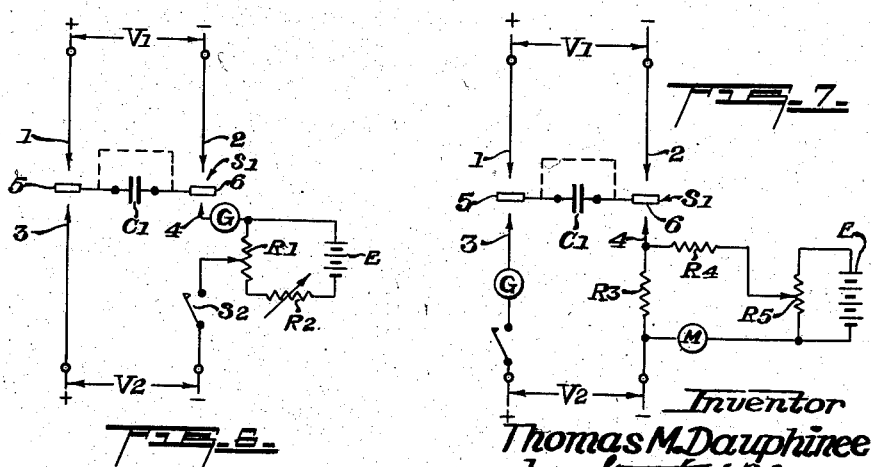
Inventor
Thomas M. Dauphinee
by Smart & Biggar
Attorneys.

July 2, 1957  T. M. DAUPHINEE  2,798,198
METHOD AND APPARATUS FOR COMPARING VOLTAGES
Filed March 31, 1952  2 Sheets-Sheet 2
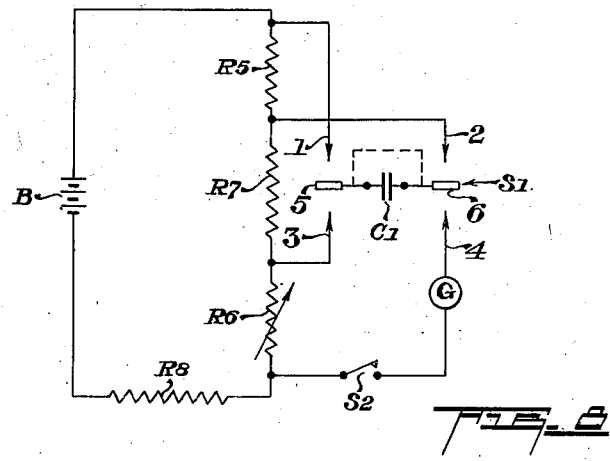
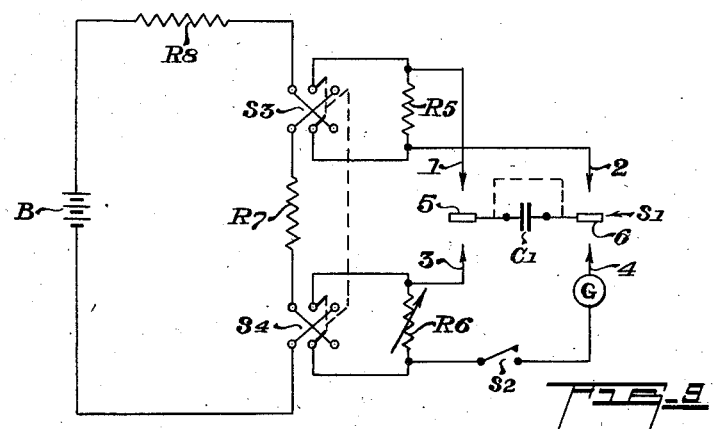
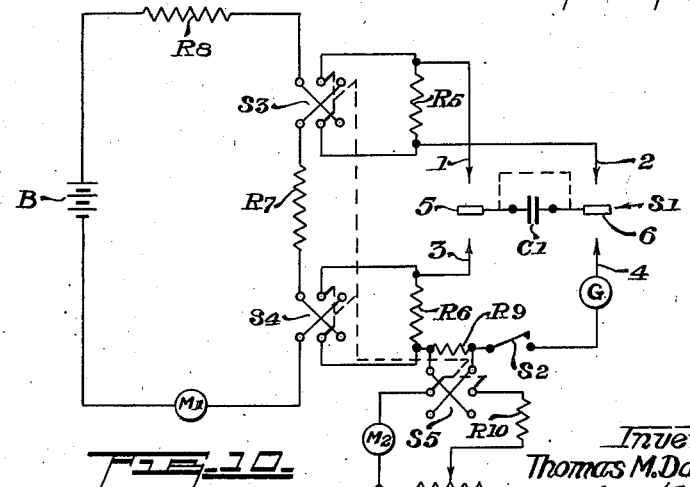
Inventor
Thomas M. Dauphinee
by Smart & Biggar
Attorneys.

United States Patent Office 2,798,198
Patented July 2, 1957

2,798,198
METHOD AND APPARATUS FOR COMPARING VOLTAGES

Thomas M. Dauphinee, Ottawa, Ontario, Canada, assignor to National Research Council, Ottawa, Ontario, Canada, a body corporate of Canada Application March 31, 1952, Serial No. 279,531

10 Claims. (Cl. 324—62)

The invention relates to a method and apparatus for comparing one direct current voltage with another.

Prior to the invention, apparatus for comparing one direct current voltage with another has usually included a bridge circuit or a circuit in which a voltage indicator is switched repeatedly from one source of voltage to the other. The results obtained with these prior circuits were often satisfactory from the viewpoint of sensitivity and accuracy but, in most cases, painstaking adjustments and a considerable length of time were required to complete the comparison and, what was often a more serious difficulty, it was necessary to have an electrical interconnection between the two sources of voltage. Consequently the prior methods and apparatus were not satisfactory in cases in which the sources of voltages must be kept isolated electrically from one another, or where a potential difference had to be maintained between the two sources of voltage.

According to the present invention, a method and apparatus is provided whereby the voltages of two sources which need not be interconnected electrically and between which a potential difference may exist can be compared with an accuracy of the same order as can be obtained by measurements in which there is an electrical connection between the two sources. According to the present invention a double-pole, double-throw, non-shorting switch has a condenser connected between its movable contacts. Connections from the sources of voltage to be compared are supplied so that operation of the switch connects the condenser alternately in the same polarity to each of the sources of voltage. Current indicating means are provided in one of the connections to the sources of voltage and means are provided to operate the switch so that the time for alternate connection of the condenser between the sources of voltage is less than the response time of the indicating means. The "response time" of the indicating instrument is the same as the "decay time" of the instrument and is the time required for the instrument to deflect from zero to maximum deflection after the application of a deflecting force, or the time required for the instrument to return to zero after removal of the deflecting force. Because the switch is of the non-shorting type there is a period in each transit of the movable contacts when all contacts are open so that under no circumstances is there a direct electrical connection between the two sources of voltage. The condenser is alternately connected to the first and second voltages so that the voltage of the condenser is always changing from the voltage of one source to that of the other and, as this change is always in the same direction, current flow occurring in any one of the connections from the sources of voltage is always in the same direction. The amount of current flow in any one of the connections is proportional to the voltage difference existing between the two sources of voltage. If the voltages of the two sources are equal, then the voltage of the condenser becomes stabilized at the same voltage and no current occurs in the connections.

The means for indicating current flow gives a direct indication of any difference in voltage which may exist between the voltages of the two sources, but if desired, a potentiometer can be inserted in one of the connections so that this difference in voltage can be cancelled to obtain a zero reading at the current indicating means.

In a preferred form of the invention two double-pole, double-throw, non-shorting switches are used and are driven synchronously with 180° difference in phase. The connections to the two switches are in parallel so that when the condenser connected between the movable contacts of one switch is connected to one source of voltage, the condenser connected between the movable contacts of the other switch is connected to the other source of voltage. This arrangement provides increased sensitivity, lower effective circuit resistance and less trouble from stray A. C. pickup. Improvements in sensitivity can also be obtained if a condenser is connected across one of the sources of voltage, or in parallel with the current indicating means.

The method and apparatus according to the invention can be used to compare the resistance values of resistors by supplying voltage drops from across the resistors to be compared to the switch. In this form of the invention, the resistors to be compared are arranged in a series circuit with a source of current and connections are provided to apply the voltage drop across each resistor to the terminals of the switch. If one of the resistors is a standard adjustable resistor it can be adjusted for zero current in the connections to the switch during operation of the switch. This arrangement according to the invention has the advantage, in the case of resistors of the potential lead type in which separate current and potential leads are provided, that when the measurement of the unknown resistance is made there is zero current flowing in the potential leads from the resistors to be measured.

The invention will be further described with reference to the attached drawings which illustrate certain preferred embodiments of it, and in which Figures 1 to 7 show circuits in accordance with the invention for comparing two sources of direct current voltage, Figures 8, 9 and 10 show circuits in accordance with the invention for comparing and measuring the resistance values of resistors, and Figure 11 shows diagrammatically one mechanism for operating the movable contacts of the switch shown in the other figures.

In the apparatus shown in Figure 1 a double-pole, double-throw, non-shorting switch S1 is shown having fixed contacts 1, 2, 3 and 4 connected to sources of voltages V1 and V2 which have the polarities indicated in the schematic diagram. The contact 4 is connected to the negative pole of the source of voltage V2 through a galvanometer G and a switch S2. A voltage V, as shown in the diagram, may exist between the two sources of voltages V1 and V2. The switch S1 has a pair of movable contacts 5 and 6 which are arranged to vibrate in synchronism between the fixed contacts 1, 2 and 3, 4 of the switch S1. A condenser C1 is connected between the movable contacts 5 and 6. Preferably, the switch S1 is a chopper or converter of one of the well known constructions in which magnetic or mechanical means are used to operate the movable contacts but, if desired, it could be operated by hand. One form of mechanical means for operating the switch S1 is shown in Figure 11, in which a driven cam 10 drives a cam follower 11 and a push rod 12 which bears against the cam follower 11 under the influence of a leaf spring 13. Movable contacts 5 and 6 are mounted on push rod 12. The galvanometer G may be replaced by any other sensitive detector for direct current and, if desired, it and the protecting switch S2 may be connected in series with one of the fixed contacts 1, 2 or 3. The period of the galvanometer G is preferably long with respect to the period of vibration of the movable contacts 5 and 6 of the switch S1 which may, for example, be of the order of from $\frac{1}{10}$ to $\frac{1}{80}$ of a second, corresponding to a frequency of 10 to 80 cycles per second. This provides a steady deflection of the galvanometer without objectionable flutter of the needle. The condenser C1 should have a capacity such that its discharge time through the resistance in the circuit is of the same order of magnitude or greater than the period of the switch S1. For example, in many cases in which the voltages V1 and V2 are derived from thermocouples, a capacity of from 100 to 300 microfarads is suitable. Paper type condensers are usually satisfactory, but in cases where precise comparisons or measurements are required higher quality condensers such as those using polystyrene dielectric should be used and the switch S1 should be mechanically driven.

To operate the apparatus, the switch S2 is opened before the movable contacts 5 and 6 of the switch S1 are set in motion, so that the galvanometer G is protected from current surges during the initial charging of the condenser C1. The switch S2 is then closed, and the movable contacts 5 and 6 of the switch S1 continue to be connected alternately to the fixed contacts 1, 2 and 3, 4 so that the condenser C1 is alternately in series with the voltages V1 and V2. When the condenser C1 is in series with the voltage V1, current flows into the condenser C1 making its voltage approach that of the source of voltage V1. The charged condenser C1 is then connected in series with the voltage V2 with the same polarity. If the voltage V1 is not equal to the voltage V2, a current flows through the galvanometer G in such a direction as to make the voltage of the condenser C1 approach the voltage V2. When the condenser C1 is connected again in series with the voltage V1, the voltage on the condenser C1 changes towards the voltage V1 without any current passing through the galvanometer G. The condenser C1 is again connected in series with the voltage V2 and a second pulse of current passes through the galvanometer G as the voltage of the condenser C1 changes towards the voltage V2. When equilibrium conditions are reached the voltage of the condenser C1 is at all times between the voltage V1 and the voltage V2 and is changing away from the voltage V1 towards the voltage V2 whenever current is passing through the galvanometer G. The current pulses which pass through the galvanometer G are thus always in the same direction. The sign and magnitude of the pulses is determined by the sign and magnitude of the difference between the voltage V1 and the voltage V2 and by the time constants of the circuits involved. If the voltage V1 is equal to the voltage V2, the voltage of the condenser C1 increases to this value and remains there. Under these conditions no discharge pulses pass through the galvanometer G and it remains undeflected. The galvanometer G thus becomes a null indicator for equality between the voltages V1 and V2, and its deflections are a measure of the sign and magnitude of any difference in voltage. A potential difference V may exist between the circuits of the sources of voltages V1 and V2 but if the potential difference V is large the usual precautions should be taken to prevent errors due to the effects of capacity to ground from circuit components, or due to leakage. One of the voltages to be compared, for example V2, may be supplied by a measuring instrument such as a potentiometer, the other (V1) being a voltage which is to be measured.

Using a mechanically driven switch S1, a 100 microfarad polystyrene condenser C1 and a high sensitivity galvanometer G, the circuit shown in Figure 1 can give null balances which are accurate to a few tenths of a microvolt provided that the potential difference V between the voltages V1 and V2 is not too large. When provisions are made for appropriate reversals to eliminate capacity, temperature and leakage effects, correspondingly better results may be obtained. The error due to a potential difference V between V1 and V2 depends on various construction factors, but in most low resistance circuits it may be made less than $\frac{1}{10^6}$ of the potential difference V. Subject to the above limitations and to the characteristics of the condenser C1 and the external circuits, balances appear to be feasible to at least $\frac{1}{10^7}$ of the total voltages being compared.

The circuits shown in Figures 2 to 10 use the basic components which have been described in connection with Figure 1 and, in these figures, the same designations are used for these components as in Figure 1.

As shown in Figure 2, two switches S1 connected in parallel can be used to obtain greater sensitivity, lower effective circuit resistance and less trouble with A. C. pickup. Each switch S1 has a condenser C1 connected between its movable contacts 5 and 6. The switches S1 are arranged to be driven synchronously with a 180 degree difference in phase so that one condenser C1 is connected to one of the sources of voltages V1 and V2 while the other condenser C1 is connected to the other source of voltage.

Figures 3 and 4 show how additional storage condensers can be used to increase the sensitivity of the circuits in cases in which the galvanometer G or the source of voltage V2 have internal resistances which are large with respect to that of the sources of voltage V1. In Figure 3 a condenser C2 is connected across the fixed contacts 3 and 4 of the switch S1 thereby causing current to flow through the galvanometer for a greater proportion of the total cycle. In Figure 4 a condenser C3 connected in parallel with the galvanometer G has the same effect.

Figure 5 shows a variation of the circuit according to the invention for a case in which the two sources of voltage V1 and V2 have a small potential difference V, or the potential difference V is stable, and there is a D. C. interconnection between the sources of voltage V1 and V2. The D. C. interconnection may, for example, be a direct connection, a battery, or a connection containing resistance. In the specific example shown in Figure 5 the voltage sources V1 and V2 are interconnected by a battery B5. In this arrangement, the two voltages which are compared by the galvanometer are the voltage across contacts 1 and 3 and the voltage across 2 and 4. The first voltage is the voltage V of the battery B5, while the second voltage is the voltage V modified by the difference between the voltages V1 and V2. As in the circuit shown in Figure 1, equality of the voltages V1 and V2 is indicated by zero current at the galvanometer G.

Figure 6 shows a circuit in which a measuring potentiometer of well known construction (comprising a potentiometer R1, a battery E, a current control resistor R2, and means for standardizing potentiometer current) is connected in series with the galvanometer G so that a measurement may be made of the voltage difference between the voltages V1 and V2. The measuring potentiometer is adjusted to cancel out the voltage difference between the voltages V1 and V2, cancellation being indicated by zero deflection of the galvanometer G. This gives a more accurate measurement of the voltage difference than can be obtained by observing the amount of the deflection of the galvanometer. As in the other circuits described the galvanometer may be connected in any one of the connections to the fixed contacts 1, 2, 3 and 4 of the switch S1.

The circuit shown in Figure 7 may be used if the difference between the voltages V1 and V2 need only be known to a few significant figures. In this circuit a known current from an auxiliary circuit (R4, R5, E and M) is passed through a resistor R3 in series with a connection to one of the fixed contacts 1, 2, 3 or 4 of the switch S1. The voltage drop across the resistor R3, which is developed by the current from the auxiliary circuit is used to cancel out the difference between the voltages V1 and V2. The magnitude of the voltage drop supplied across the resistor R3 can be calculated from the value of the resistor R3 and the reading of the ammeter M.

A circuit according to the invention may be applied to the comparison of resistors which are connected in series. The basic circuit is shown in Figure 8 and in more refined forms in Figures 9 and 10. The method is particularly suited to comparison of equal or nearly equal resistors of the potential lead type. In Figure 8 the potential leads of resistors R5 and R6 are connected to the switch S1 as shown. These resistors R5 and R6 are connected by means of their current leads in series with one another and with a source of fairly constant D. C. current such as a battery B and a current controlling resistor R8. When any current flows in this D. C. current circuit it flows identically through the two resistors R5 and R6 and the ratio of the potential drops across R5 and R6 is therefore equal to the ratio of their resistances. The difference between the potential drops across R5 and R6 will be the product of the difference between their resistances multiplied by the current passing through them. If resistance R6 is a variable, the galvanometer G of Figure 8 will give a null reading for any value of battery current when the variable resistor R6 is set exactly equal to resistor R5. Figure 9 shows a modification of the circuit of Figure 8 to provide for reversal of the currents passing through the resistors R5 and R6 without changing the sign or magnitude of the potential difference between corresponding points on the resistors. If switches S3 and S4 are reversed simultaneously the potential differences due to the resistances of R5 and R6 are reversed while most intrusive effects retain their polarity at the galvanometer terminals. If $R5=R6$ the galvanometer deflection is not affected by reversal. The procedure corresponds to reversal of the current through a Wheatstone bridge and may be used to eliminate the effects of thermal electromotive forces, stray capacity and leakage in the switch S1. It will be noted that at balance there is no current except for the very small current due to intrusive effects flowing in any of the potential leads from the resistors R5 and R6 and that for this reason the resistance of the potential leads is completely eliminated from the result without requiring two balancing procedures. Constancy of potential lead resistance is not required. The result is also independent of any resistance R7 which may be in the current lead joining the two resistors R5 and R6 except as it affects leakage through the circuits to the switch S1. It will be noted that in the circuits of Figures 8 and 9 ratio arms such as are found in a Wheatstone bridge are unnecessary, and no particular benefit is obtained from making the potential leads equal in resistance. For instance, in the case of resistance thermometry, the Meuller bridge which is commonly used could be replaced by a simple variable potential lead resistor and the circuit of Figure 9, thus eliminating both ratio arms and the commutator of the bridge. The thermometer would not require almost equal lead resistance as is at present the case.

Figure 10 shows a circuit for comparing two nearly equal resistances. A direct measurement of the difference in resistance may be made if a potentiometer (preferably of the well known Lindeck type as shown as R9, R10, R11, B1 and M2 in Figure 10) is inserted in one of the potential leads of the resistors R5 and R6 and a current meter M1 is put in series with the current source B, a current control resistor R8 and the resistors to be compared, R5 and R6. While current from the current source is flowing through the resistors R5 and R6 the potentiometer is adjusted to give zero current through the potential leads as indicated by galvanometer G. The difference in resistance may be calculated from the current through the resistors as read on meter M1 and the magnitude and sign of the potentiometer voltage as determined from the value of resistance R9 and the reading of the meter M2.

Switches S3, S4 and S5 may be used to make appropriate reversals for elimination of errors.

Variations in the disclosed apparatus will occur to those skilled in the art. For example, the arrangement of parallel connected switches S1 described with reference to Figure 2 can be applied to the circuits shown in Figures 3 to 7 without difficulty. It should be noted that the switches S1 should be directly connected in parallel so that the galvanometer or potentiometer used in the connections to the switches are in connections which carry current to or from both switches. More than two switches S1 may be connected in parallel with improved results providing phase differences are maintained between their cycles of operation. For example, three switches S1 may be connected in parallel and operated with a 120° phase difference between any two of the switches.

What I claim as my invention is:

1. Apparatus for comparing a first direct current voltage with a second direct current voltage comprising, a double-pole double-throw non-shorting switch, a condenser connected between the movable contacts of said switch, connection leads for supplying said first and second direct current voltages to the stationary contacts of said switch so that operation of said switch connects said condenser alternately in the same polarity to each of said first and second voltages, direct-current sensitive indicating means connected in series in one of said leads for indicating the flow of direct current therein, and means for operating said switch so that the time for successive connection of said condenser to the stationary contact to which said one lead is connected is less than the decay time of said indicating means when connected as aforesaid.

2. Apparatus for comparing the resistance of a first resistor with that of a second resistor comprising, means for placing said first and second resistors in series with each other and with a source of direct current, a double-pole double-throw non-shorting switch, a condenser connected between the movable contacts of said switch, leads connecting said first and second resistors to the stationary contacts of said switch so that operation of said switch connects said condenser alternately in the same polarity across each of said first and second resistors, direct-current sensitive indicating means connected in series in one of said leads for indicating the flow of direct current therein, and means for operating said switch so that the time for successive connection of said condenser to the stationary contact to which said one lead is connected is less than the decay time of said indicating means when connected as aforesaid.

3. Apparatus for measuring the resistance of a first resistor comprising, a second resistor variable to known resistance values, means for placing said first and second resistors in series with each other and with a source of direct current, a double-pole double-throw non-shorting switch, a condenser connected between the movable contacts of said switch, leads connecting said first and second resistors to the stationary contacts of said switch so that operation of said switch connects said condenser alternately in the same polarity across each of said first and second resistors, direct-current sensitive indicating means connected in series in one of said leads for indicating the flow of direct current therein, and means for operating said switch so that the time for successive connection of said condenser to said one of said leads is less than the decay time of said indicating means when connected as aforesaid.

4. Apparatus according to claim 1 wherein said switch operating means operates said switch at a frequency of between 10 and 80 cycles per second.

5. Apparatus according to claim 1 and including a second condenser connected across the pair of leads supplying one of said direct current voltages to said switch.

6. Apparatus according to claim 1 and including a second condenser connected in parallel with said indicating means.

7. Apparatus according to claim 1 and including a source of potential connected in said one lead in opposition to the flow of direct current therein, said source of potential being adapted to be adjusted to reduce said direct current flow to zero value.

8. Apparatus according to claim 2 and including switch means for reversing the direction of current flow through said first and second resistors while maintaining the magnitude and polarity between corresponding points on said first and second resistors.

9. Apparatus according to claim 2 and including a potentiometer connected in series in one of said leads, means to supply current to said potentiometer to oppose the flow of direct current in said one lead, said potentiometer being adapted to be adjusted to reduce said direct current flow to zero value, means to indicate the potential supplied in said one of said leads by said potentiometer, and means to indicate the current flow through said first and second resistors.

10. Apparatus according to claim 8 and including a potentiometer connected in series in one of said leads, means to supply current to said potentiometer to oppose the flow of direct current in said one lead, said potentiometer being adapted to be adjusted to reduce said direct current flow to zero value, means to indicate the potential supplied in said one of said leads by said potentiometer, and means to indicate the current flow through said first and second resistors.

References Cited in the file of this patent

UNITED STATES PATENTS

| | | |
|---|---|---|
| 2,285,482 | Wunsch | June 9, 1942 |
| 2,565,892 | Stanton | Aug. 28, 1951 |
| 2,596,955 | Howe | May 13, 1952 |
| 2,619,514 | Stanton | Nov. 25, 1952 |